United States Patent [19]

MacInnis et al.

[11] 3,887,680

[45] June 3, 1975

[54] PROCESS FOR RECOVERING TUNGSTEN FROM TUNGSTEN CARBIDES CONTAINING AN IRON GROUP OF METALS

[75] Inventors: Martin B. MacInnis; Clarence D. Vanderpool, both of Towanda; Carl W. Boyer, Wysox, all of Pa.

[73] Assignee: GTE Sylvania Incorporated, Stamford, Conn.

[22] Filed: Oct. 23, 1973

[21] Appl. No.: 408,494

[52] U.S. Cl. .................. 423/55; 423/53; 423/58; 423/61; 423/150; 75/119
[51] Int. Cl. ............................................ C01g 41/00
[58] Field of Search .......... 423/55, 58, 61, 53, 140, 423/150

[56] References Cited
UNITED STATES PATENTS

| | | | |
|---|---|---|---|
| 1,293,404 | 2/1919 | Giles | 423/58 |
| 2,485,175 | 10/1949 | Trapp | 423/53 |
| 2,704,240 | 3/1955 | Avery | 423/53 |
| 2,848,313 | 8/1958 | Takahashi et al. | 423/53 UX |
| 3,438,730 | 4/1969 | Schwayder | 423/53 |
| 3,560,199 | 2/1971 | Jönsson | 423/53 X |
| 3,635,674 | 1/1972 | Schwayder | 423/53 |

*Primary Examiner*—Herbert T. Carter
*Attorney, Agent, or Firm*—Norman J. O'Malley; Donald R. Castle; William H. McNeill

[57] ABSTRACT

The process wherein tungsten carbide containing an iron group metal such as cobalt is oxidized to form a friable oxidation product, the oxidation product is ground and thereafter treated to recover the tungsten values is improved by digesting the oxidation product in an aqueous solution of an alkali metal hydroxide under controlled conditions of temperature and pressure.

5 Claims, No Drawings

3,887,680

PROCESS FOR RECOVERING TUNGSTEN FROM TUNGSTEN CARBIDES CONTAINING AN IRON GROUP OF METALS

BACKGROUND OF THE INVENTION

1. Field of the Invention

This invention relates to the recovery of tungsten values from scrap tungsten carbide containing a metal of the iron group. More particularly, it relates to a process wherein essentially all of the tungsten values is recovered from such scrap tungsten carbide.

2. Prior Art

Recovery of tungsten values from scrap tungsten carbide has been a problem in the carbide industry for a number of years. It is more difficult to recover the tungsten values in usable form when the tungsten carbide is cemented with a binder which generally is a metal of the iron group. Normally cobalt is the preferred iron group metal that is used to cement the particles of tungsten carbide together.

Various processes have been used in the past with varying degrees of success. Fusion with strong oxidizing agents such as sodium nitrate has been one method. However, the process must be carefully controlled or explosions can result. Additionally, carbonate compounds form during the reaction and upon acidification produce foaming due to the liberation of carbon dioxide. Another method is the liquid zinc process which is disclosed in a paper, "Recovery of Metallurgical Values from Industrial Wastes" at the Utilization Symposium held in Chicago, Ill. in March, 1970. However, it involves complicated apparatus and the zinc that is used must be eventually removed either by dissolution or distillation.

An additional process has been a dehydration-hydration process which involves forming an anhydrous compound by chlorination, immersing the hard scrap in water to form the hydrated salt. The formation of hydrated salt creates internal stresses within the scrap causing disintegration. The hydrated salt is leached and the process is repeated. This method of disintegration is time consuming and expensive. The method is disclosed in detail in U.S. Pat. No. 2,848,313.

An even more recent patent is U.S. Pat. No. 3,635,674 which involves using ammonia or an amine in a sealed container containing elemental oxygen under pressure and it is limited by the diffusion of oxygen to the cobalt surface.

Additional processes include the pneumatic pulverization process disclosed in U.S. Pat. No. 3,184,169 which requires a large equipment investment and high pressure air. Furthermore, the chemical leaching steps and hydrogen reduction add to the cost and are time consuming.

Still another method is the phosphoric acid treatment process given in U.S. Pat. No. 3,438,730. Autogeneously milling during the treatment with phosphoric acid and elemental oxygen pressure of about 25 p.s.i. is required to obtain a viable production-type process.

The rate of oxidation of hard carbides in air disclosed in U.S. Pat. No. 2,704,240 increases with increasing temperatures. It has been determined, however, that the presence of the iron group metals form tungstates thus decreasing the yield of recoverable tungsten. This is particularly disadvantageous when carbides containing a high percentage of binder are recovered. For example, a material which contains around 19 percent cobalt could react with about 60 percent of the tungsten values thus decreasing the yield considerably. Also, it has been found that the only practical rate of oxidation is between about 800°C and 900°C.

It is believed that a process which is relatively low in cost and uses a specific air-oxidation process but recovers the tungsten at near theoretical yields is an advancement in the art.

OBJECTS AND SUMMARY OF THE INVENTION

It is an object of this invention to provide an improved air oxidation process for the recovery of tungsten values from scrap tungsten carbide containing an iron group of metals.

It is an additional object of this invention to provide an economical process for the recovery of tungsten values from tungsten carbide.

It is a further object of this invention to provide a process which recovers tungsten values from tungsten carbide in near theoretical yields.

These and other objects of the invention are achieved in one aspect of this invention by an improvement wherein tungsten carbide containing a metal of the iron group is air-oxidized to form a friable oxidation product. The oxidation product is ground and thereafter treated to recover the tungsten values. The improvement comprises air oxidating the cemented carbide at temperatures between about 800°C and 900°C and digesting the oxidation product in an aqueous solution of an alkali metal hydroxide at a temperature of from about 140°C to about 195°C and at a pressure of from about 50 to 200 pounds per square inch for at least about seven hours.

DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

While the present invention is particularly suited to recovery of tungsten values from cemented tungsten carbides, it is not limited thereto since the recovery process can be applied to any scrap tungsten carbide. The tungsten carbide is oxidized in air at a temperature preferably from about 825°C to about 850°C. Although higher temperatures and lower temperatures can be used, the oxidation rate is slowed down considerably. Upon heating in air at 825°C to about 850°C for a number of hours which is dependent upon the size of the cemented carbide piece that is to be oxidized, the material mushrooms and forms a friable product which can easily be ground to a powder form. The powder is thereafter charged to an aqueous solution of an alkali metal hydroxide and is heated under pressure for a number of hours. The iron group metal tungstate that is formed is converted to a water soluble alkali metal tungstate and the iron group metal is in a water insoluble form thereby allowing a complete separation of the tungsten values from the iron group of metals. The sludge that is formed contains the metal from the iron group. If desired, the sludge can be treated to recover the metal vales contained therein. The tungsten is in the form of an alkali metal tungstate which can easily be converted to tungsten oxide or tungsten metal by normal tungsten treatment.

As previously mentioned, the binder most commonly used for tungsten carbide is cobalt. The level of cobalt will depend upon the end use of the cemented carbide. As the cobalt level is decreased the hardness increases but the mechanical strength descreases. As the cobalt level increases, the strength increases but the hardness decreases. Most commercial cemented tungsten carbide will contain from about 4 to 20 percent by weight of cobalt.

Although any alkali metal hydroxide can be used, sodium hydroxide is preferred because of its availability and cost. An aqueous solution containing from about 20 to about 50 percent NaOH is further preferred. After the oxidized material is ground to a powder it is charged into the alkali metal hydroxide at a temperature of at least about 20°C. At least a stoichiometric amount of the alkali metal hydroxide must be present to enable an alkali metal tungstate to be formed. An excess of up to about 50 percent of theory is preferred to insure that all of the tungsten values are converted to a soluble tungsten form. The pressure used during the digestion is generally from about 50 to about 200 psig. About 6 to 10 hours is required to convert the tungsten to a water soluble form at the foregoing temperatures and pressures. The higher pressures and high temperatures tend to promote and shorten the time required, however, use of temperatures about 170°C and and pressures above about 115 psig. do not appreciably effect the rate of reaction. Since it is more costly to use higher temperatures and pressures, the before recited ranges are not generally exceeded.

To more fully illustrate this invention, the following detailed example is presented. All parts and proportions are by weight unless otherwise indicated.

EXAMPLE I

About 100 parts of a cemented tungsten carbide containing about 6 percent cobalt is fired in air for about 48 hours at 825°C. The hard carbide fired obtains a flower-like appearance which is easily broken up into a powder. This powder is charged into a pressure reactor containing sodium hydroxide at about 20°C. The temperature is increased until the pressure is about 115 lbs. per square inch. After maintaining the temperature and pressure for about 7 hours, the material is cooled and filtered. The filtrate is analyzed and is determined to contain over about 99 percent of the total tungsten. The sludge contains 58 percent cobalt and accounts for essentially all of the cobalt. Thus, the process results in essentially complete separation and provides a yield close to 100 percent.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein a composition comprising tungsten carbide particles cemented with cobalt as a binder is oxidized to a friable oxidation product, the product is thereafter formed into discrete particles and the particles are treated to recover the tungsten values, the improvement comprising:
   a. oxidizing said composition in air at a temperature between about 800°C and 900°C for a time sufficient to form a friable oxidation product and
   b. recovering tungsten valves by digesting the particles of oxidation product in an aqueous alkali metal hydroxide solution at a temperature of from about 140°C to 195°C and under pressure of from about 50 to 200 pounds per square inch for about 6 to 10 hours to form watersoluble alkali metal tungstate and a sludge containing cobalt values 2. An improvement according to claim 1 wherein said air oxidation is at a temperature of from about 825°C to about 850°C.

3. An improvement according to claim 2 wherein said alkali metal is sodium.

4. An improvement according to claim 3 wherein said sodium hydroxide solution contains from about 20 to 50 percent by weight of sodium hydroxide.

5. An improvement according to claim 4 wherein said digestion pressure is from about 115 to about 175 pounds per square inch.

* * * * *